United States Patent [19]

Gaensslen et al.

[11] B 3,919,569

[45] Nov. 11, 1975

[54] DYNAMIC TWO DEVICE MEMORY CELL WHICH PROVIDES D.C. SENSE SIGNALS

[75] Inventors: Fritz H. Gaensslen, Yorktown Heights; Paul J. Krick, Crugers, both of N.Y.

[73] Assignee: International Business Machines Corporation, Armonk, N.Y.

[22] Filed: Dec. 29, 1972

[21] Appl. No.: 319,402

[44] Published under the Trial Voluntary Protest Program on January 28, 1975 as document no. B 319,402.

[52] U.S. Cl. .................. 307/304; 307/279; 357/24; 340/173

[51] Int. Cl.$^2$ ..................... H03K 3/26; H03K 19/08

[58] Field of Search..... 317/235 B, 235 G; 307/238, 307/251, 304, 279; 340/173 CA

[56] References Cited

UNITED STATES PATENTS

| | | | |
|---|---|---|---|
| 3,609,479 | 9/1971 | Lin et al. | 317/235 |
| 3,697,962 | 10/1972 | Beausoleil et al. | 307/238 |
| 3,721,839 | 3/1973 | Shannon | 317/235 |
| 3,794,862 | 2/1974 | Jenne | 317/235 G |

FOREIGN PATENTS OR APPLICATIONS

| | | | |
|---|---|---|---|
| 2,105,251 | 4/1972 | France | 317/235 |

*Primary Examiner*—Andrew J. James
*Attorney, Agent, or Firm*—Thomas J. Kilgannon, Jr.

[57] ABSTRACT

A semiconductor two device memory cell is disclosed in which the two devices are complementary. The cell is best implemented in the integrated circuit environment and may be fabricated using well known non-complementary fabrication techniques. The cell incorporates a floating region or substrate — within — a — substrate on which charge is stored in different amounts to achieve different potentials on the region thereby controlling, in one mode, the threshold of a field effect transistor of which the floating region forms a part. In a different mode, the floating region or substrate forms a drain or source region for a switching transistor which is formed in its own substrate. The latter substrate, which is formed from a semiconductor chip or wafer, besides forming the channel region of the switching transistor acts as a source for a sensing transistor which is formed by a region of opposite conductivity type in the floating region, the floating region and the substrate itself. The floating region is charged to one of two potentials when the floating region is a drain or source of the switching transistor and, the current flow is controlled by the potential on the floating region when it operates as the substrate for the sensing transistor.

7 Claims, 4 Drawing Figures

DYNAMIC TWO DEVICE MEMORY CELL WHICH PROVIDES D.C. SENSE SIGNALS

BACKGROUND OF THE INVENTION

1. Field of the Invention

This invention relates generally to semiconductor memory cells which store binary information in the form of stored charge. More specifically, it relates to a memory cell formed from a pair of complementary field effect transistors which are so arranged that charge is stored in a capacitance which is formed from the junction capacitance and other stray capacitances of the FET devices involved. Because of this feature, a capacitor per se need not be fabricated for storage of charge. In addition, the substrate sensitivity of one of the pair of complementary devices is controlled such that the threshold of a sensing transistor is controlled to pass two different current levels during a read out portion of the memory cell cycle. The two device memory cell lays out in an area which is comparable with a single FET-capacitor combination and also provides d.c. sense currents.

2. Brief Description of the Prior Art

Complementary device memory cells are well known in the semiconductor memory art. Most, however, incorporate cross coupled bistable storage transistors and complementary load devices. Most of these arrangements store charge on the gate capacitance of a field effect transistor causing that device to conduct or not conduct depending upon whether the device is *n* channel or *p* channel. More often than not, the charge on the gate capacitance is utilized to control the conduction of an associated channel and d.c. sense currents are available. No memory cell is known, however, wherein the substrate sensitivity of one of a pair of complementary transistors is controlled by the other of a pair of complementary transistors, resulting in a sensing transistor which either conducts or does not conduct with the same voltage on its gate depending on whether the threshold of that device is at one level or another.

SUMMARY OF THE INVENTION

The present invention, in its broadest aspect, is directed to a semiconductor memory cell which comprises a semiconductor substrate of first conductivity type and a floating region of second conductivity disposed in the substrate. The cell further comprises means for applying at least two different amounts of charge to the floating region to establish at least two different potential levels therein and further calls for means electrically connected to the floating region for causing current proportional to the two different potential levels flow in the floating region.

In accordance with more specific aspects of the present invention, the means for applying different amounts of charge to the floating region includes a region of second conductivity type disposed in the substrate and means for electrically interconnecting the regions of second conductivity type. In a similar more specific aspect, the means for causing current flow in the floating region includes a region of first conductivity type disposed in the floating region and further includes means for electrically interconnecting that region of first conductivity type and the substrate.

In accordance with still more specific aspects of the present invention, a semiconductor memory cell is disclosed, comprising a first substrate of one conductivity type; a second substrate of second conductivity type formed in the first substrate; a region of second conductivity type disposed in the first substrate; a region of one conductivity type disposed in the second substrate; and means connected to the regions of second conductivity type and the first and second substrates for applying at least first and second potentials to the second substrate to adjust the threshold voltage thereof to at least two different values.

In addition, the memory cell further includes means connected to the first and second substrates and the region of one conductivity type for controlling the flow of current between the region of one conductivity type and the first substrate.

In accordance with still more specific aspects of the present invention, said one and second semiconductor conductivity types may be *n* and *p*, respectively, or *p* and *n*, respectively.

In accordance with still more specific aspects of the present invention, the means for controlling the threshold voltage of the second substrate includes a first pulsed source connected to the region of second conductivity type, a conductor disposed in insulated spaced relationship with the first and second substrate and said regions having a portion disposed in electric field coupled relationship with a portion of said first substrate which is disposed between said second substrate and said region of second conductivity type and, a second pulsed source connected to said conductor. The activation of at least one of the pulsed sources is sufficient to apply a voltage to the second substrate.

In accordance with still more specific aspects of the present invention, the means for controlling the flow of current includes a pulsed source connected to the region of one conductivity type, a conductor disposed in insulated spaced relationship with the first and second substrates and said regions having at least a portion thereof disposed in electric field coupled relationship with the second substrate. Also included is a second pulsed source connected to the conductor, the simultaneous activation of the sources controlling the flow of current between the region of one conductivity type and the first substrate.

In operation, one of the devices of the memory cell of the present invention is utilized as a switching transistor to charge a floating region to one of two potentials which are representative of a binary 1 and a binary 0. Because of the complementary character of the two devices involved, when one device is operational, the other device is inoperative. Thus, when the switching transistor is activated, the sense transistor is inoperative. Thus, during a write cycle, the switching transistor is utilized to charge the substrate of the sense transistor to an appropriate potential and that charge remains locked in the floating region by the removal of potentials from the switching transistor. When sensing is desired, appropriate potentials are applied to the sensing transistor and current proportional to the potential on the substrate of the sensing transistor flows.

It is, therefore, an object of the present invention to provide a memory cell comprising a pair of complementary field effect transistors which does not require complementary fabrication techniques.

Another object is to provide a two device memory cell in which the storage or non-storage of charge is utilized to affect the threshold of a sensing transistor.

Still another object is to provide a memory cell which has a d.c. sense output signal.

The foregoing and other objects, features and advantages of the present invention will be apparent from the following more particular description of preferred embodiments as illustrated in the accompanying drawings.

DESCRIPTION OF A PREFERRED EMBODIMENT

Figure 1:
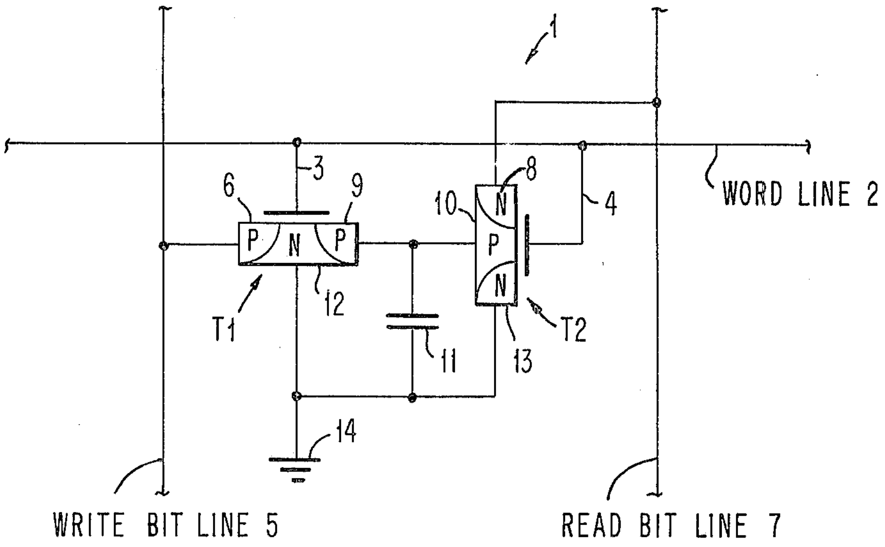
FIG. 1 is a schematic circuit diagram of a memory cell having a pair of complementary field effect transistors one of which is utilized to switch charge into a capacitance and the other of which is utilized as a sensing device, the threshold of which is a function of the amount of charge stored in the circuit capacitance.

Referring now to FIG. 1, there is shown therein a memory cell 1 consisting of a pair of complementary field effect transistors T1, T2. A word line 2 is connected in parallel with the gate electrodes 3, 4 of field effect transistors T1 and T2, respectively. Because of the complementary characteristics of transistors T1 and T2, a pulse on word line 2 of the proper polarity will turn on device T1 and T2 off simultaneously. A pulse of opposite polarity, of course, turns device T2 on simultaneously with the turning off of device T1. A write bit line 5 is connected to a diffusion 6 of device T1 while a read bit line 7 is connected to a diffusion 8 of device T2. Diffusion 9 of device T1 is connected to substrate 10 of device T2. A capacitor 11 which, as will be seen hereinafter, is a parasitic capacitance composed of junction and oxide capacitances is connected to diffusion 9 of device T1 and substrate 10 of device T2. Capacitor 11, substrate 12 of device T1 and diffusion 13 of device T2 are all connected in parallel to a ground connection 14.

Figure 2:
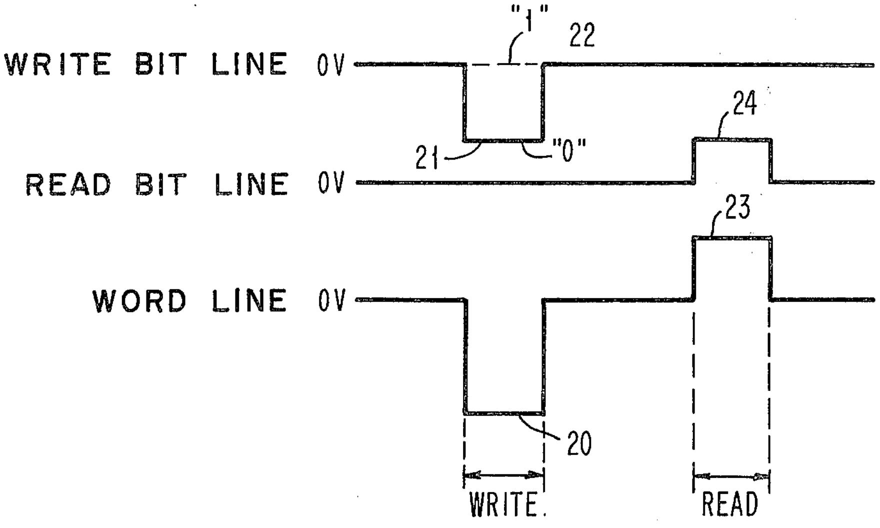
FIG. 2 shows a plurality of waveforms utilized in writing and reading the memory cell of FIG. 1.

In operation, memory cell 1 of FIG. 1 is actuated by pulsed signals represented by the solid and dashed line waveforms shown in FIG. 2. Information in the form of a 1 or a 0 is stored in memory cell 1 by storing charge or not storing charge on capacitor 11. Capacitor 11 is effectively the storage element of memory cell 1 and device T1 can be characterized as a switching transistor, which, in response to signals on word line 2 and write bit line 5, either permits charge to be stored or not to be stored on capacitor 11. Device T2, which may be characterized as a sensing device, either permits or prevents d.c. current flow from passing therethrough, depending upon the potential on its substrate 10, which, in turn, is a function of the potential on capacitor 11. Device T2, of course, is enabled by the application of appropriate signals on word line 2 and read bit line 7. Conduction via device T2 to ground 14 occurs depending upon the threshold voltage of device T2 which can assume either a high threshold or a low threshold depending upon the potential on capacitor 11. If the threshold of device T2 is high, device T2 will not conduct provided, of course, the potential applied via word line 2 to gate electrode 4 of device T2 does not cause the high threshold value to be exceeded. Under the low threshold voltage condition, the same potential applied via word line 2 to gate electrode 4 of device T2 permits device T2 to conduct and a d.c. current flows via device T2 to ground 14 as long as a potential is applied to gate electrode 4.

In more specific terms, assuming no charge on capacitor 11, to write a binary 1 or 0 into capacitor 11, a negative voltage shown at 20 in FIG. 2 is applied to word line 2. At the same time, either a negative voltage representing a binary 0 and shown in FIG. 2 at 21, or zero voltage, representing a binary 1 and shown at 22 in FIG. 2 is applied to write bit line 5 to cause device T1 to either conduct or not conduct. The simultaneous application of a negative voltage on word line 2 and write bit line 5 causes p channel device T1 to conduct thereby applying charge to capacitor 11. As is well known, the application of a negative voltage on the gate electrode of a p channel field effect transistor drives electrons from the surface of substrate 12 forming a p channel which interconnects p type diffusion 6 and 9 of device T1, thereby permitting current to flow via device T1 into capacitor 11. When waveforms 20 and 22 of FIG. 2 are applied to gate electrode 3 and diffusion 6, respectively, of device T1 no conduction occurs even though the channel is formed in substrate 12 by the presence of a negative potential on gate electrode 3 because a negative potential is required on diffusion 6 to cause conduction when capacitor 11 is at zero volts potential. Where, however, capacitor 11 is already charged up to the potential of write bit line 5 and zero potential is applied to write bit line 5, capacitor 11 discharges via device T1 and capacitor 11 assumes the desired state. In like manner, when capacitor 11 is charged up to the potential represented by waveform 21 in FIG. 2, applying a similar potential to write bit line 5 causes no conduction and capacitor 11 remains charged to its initial value.

While the writing function is being carried out, field effect transistor T2 is effectively isolated from transistor T1 and capacitor 11 with the exception that the potential on substrate 10 of device T2 at any instant is the same value as the potential on capacitor 11. In any event, the negative potential on word line 2 during a write condition only renders device T2 more unable to conduct, since n channel devices require a positive potential on their gate electrodes to permit conduction. As is well known, a negative potential on gate electrode 4 of device T2 drives electrons away from the surface of device T2, rendering the channel region of that device more p type.

A positive pulse, on the other hand, attracts electrons toward the surface of device T2 and forms a channel between diffusions 8 and 13, thereby permitting conduction of device T2 provided the potential on gate electrode 4 exceeds the device threshold. As has been indicated previously, the device threshold is a function of the potential on substrate 10 which in turn is governed by the charged or uncharged condition of capacitor 11.

Assuming capacitor 11 to be in a charged state or a binary 0 condition, a negative potential is applied to substrate 10 of device T2. To detect the charged condition of capacitor 11, a positive potential represented by waveform 23 in FIG. 2 is applied to word line 2 during a read interval. Simultaneously, a positive pulse 24 is applied to diffusion 8 via read bit line 7 to actuate device T2. The voltage applied to word line 2, represented by waveform 23 in FIG. 2, is of such a value that the negative voltage on substrate 10 (applied from capacitor 11) adjusts the device threshold of T2 so that conduction will not take place. Where, however, the voltage applied to substrate 10 from capacitor 11 is zero, the same potential as represented by waveform 23 in FIG. 2 applied to word line 2 permits conduction of device T2 because the potential applied on gate 4 of T2 now exceeds the threshold voltage of device T2. During the reading time, the word line potential is positive and such a potential appearing on gate electrode 3 on device T1 renders that device nonconductive, in effect, isolating the switching device T1 while sensing device T2 is in operation.

In connection with sensing device 2, it should be appreciated that a d.c. current flows via read bit line 7 through device T2 to ground 14 and that this current is present as long as word line 2 is energized by waveform 23. Because of this feature, sense amplifiers are not needed to amplify the resulting signal, since the device characteristics such as resistivity may be adjusted to provide current flow in the hundreds of miliampere range.

Because of the inherent leakage of the floating substrate, the information is stored in a dynamic mode and, therefore, has to be refreshed periodically. Restoring the information may be done, for example, under control of the sensing device T2.

Figure 3:
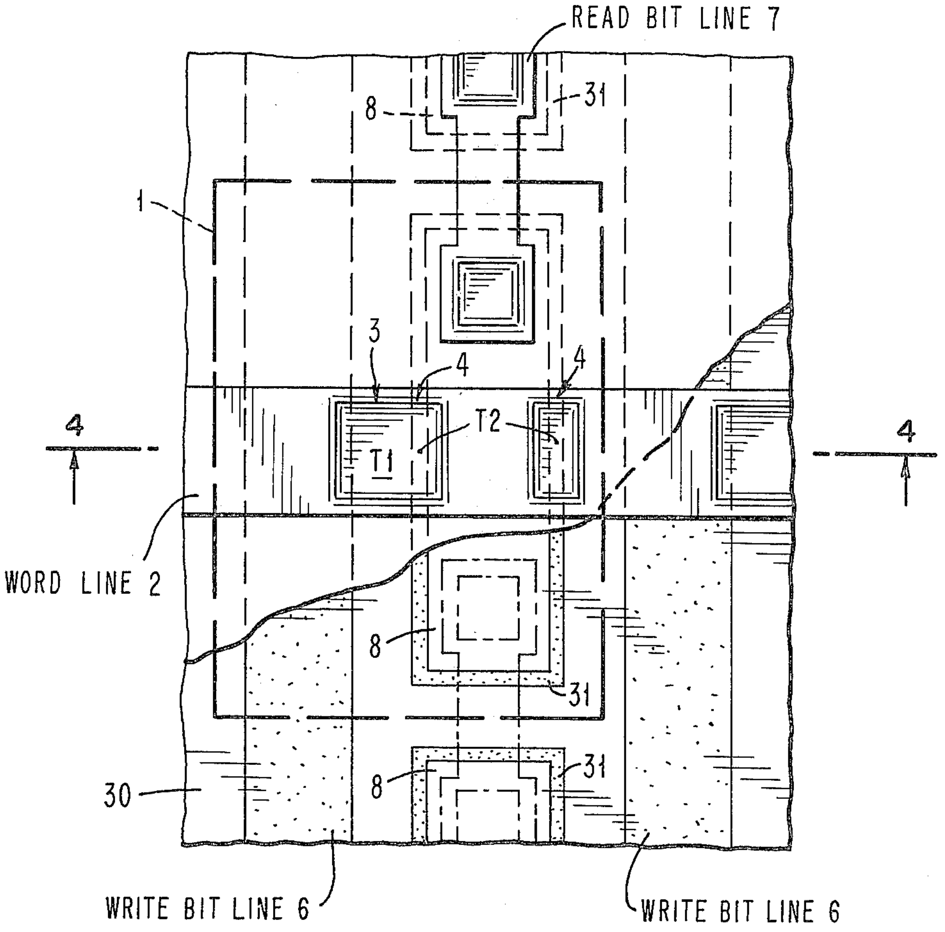
FIG. 3 shows a plan view of a layout of the memory cell of FIG. 1. A semiconductor substrate of one conductivity has formed therein a diffusion of opposite conductivity type which forms a floating region or substrate for the storage of charge. Another diffusion of the same conductivity type as the first mentioned diffusion in conjunction with the floating region and substrate forms one field effect transistor. Another diffusion of one conductivity type formed within the floating region forms a complementary transistor with the substrate and floating region.
Figure 4:
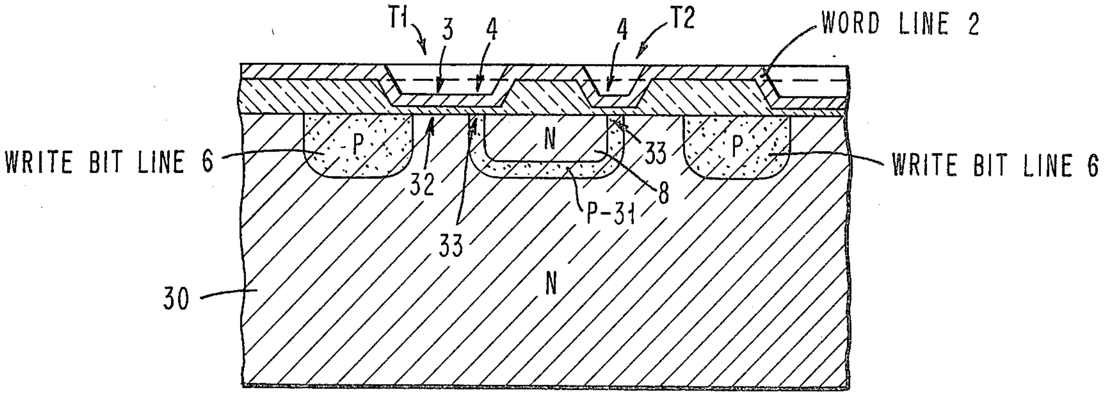
FIG. 4 is a cross-sectional view taken along lines 4—4 of FIG. 3, showing the relationship of gates, diffusions and channel regions of the complementary field effect transistors.

Referring now to FIGS. 3 and 4, a plan view and cross-sectional view, respectively, of a structural arrangement useful in the practice of the present invention are shown. Reference numbers used to identify certain elements in FIG. 1 are utilized in FIGS. 3 and 4 to identify the same elements where feasible. In FIGS. 3 and 4 write bit line 5 of FIG. 1 is electrically the same point as diffusion 6 and thus appears in FIGS. 3 and 4 as a p type diffusion identified as write bit line 6 in an n type substrate 30. The n type substrate 30 electrically acts as substrate 12, diffusion 13, the grounded side of capacitor 11, and ground 14 as shown in FIG. 1. The p type diffusion 9 of device T1 and p type substrate 10 of device T2 are represented in FIGS. 3 and 4 by a p type diffusion 31 which is formed simultaneously with diffusion 6. Diffusion 31 also forms the other side of capacitor 11 as shown in FIG. 1, which, in cooperation with substrate 30, provides the junction capacitance which is a portion of the overall circuit capacitance represented by capacitor 11. Diffusion 31 may otherwise be characterized as a substrate — within — a — substrate or a floating region. Read bit line 7 includes in FIGS. 3 and 4 diffusion 8 and is identified therein as read bit line 7. Word line 2 is shown in FIGS. 3 and 4 as a conductive line extending transversely of write bit lines 6 and spaced from the surface of substrate 30 by thick and thin regions of a dielectric material. Where word line 2 is spaced from substrate 30 by a thin dielectric, those portions of word line 2 act as gate electrodes 3, 4 as shown in FIG. 1 and are disposed in FIGS. 3 and 4 opposite channel regions 32, 33, respectively. Noting in FIGS. 3 and 4 the juxtaposition of gates 3 and 4 relative to diffusions 6 and 31 and substrate 30 and diffusion 8, it should be clear that gates 3 and 4, even though actuated with the same potential simultaneously, enable or disable different channel regions, 32, 33 at the same time depending on the polarity of voltage applied to word line 2. Thus, when aa negative potential is applied to word line 2, channel 32 is enabled by gate 3 permitting conduction between write bit line 6 and p type diffusion 31. At the same time, the same negative potential is applied to channel region 33 via gate portions 4 of word line 2 further disabling device T2 which is formed from substrate 30, *p* type diffusion 31 and n type diffusion 8.

In FIG. 3, read bit line 7 extends from one diffusion 8 to the next succeeding diffusion such that waveform 24 as shown in FIG. 2 is applied to all diffusions 8 in parallel when memory cells 1 are arranged in array form on semiconductor substrate. Thus, d.c. sense current flows between substrate 30 via channel region 33 which is disposed under gate regions 4 to diffusion 8 which in turn is connected to read bit line 7. During a write mode, word line 2 is energized with negative waveform 20 as shown in FIG. 2 and diffusion 6 is energized via write bit line 5 by either waveform 21 or waveform 22 which applies or does not apply charge to floating region 31 via channel region 32.

The arrangement shown in FIGS. 3 and 4 may be fabricated using conventional non-complementary fabrication techniques. Thus, a masking layer such as silicon dioxide may be formed on an appropriate semiconductor substrate such as silicon, germanium, or gallium arsenide and, using well known photolithographic masking and etching techniques, apertures may be formed where it is desired to introduce p and n type dopants. One approach is to coat the exposed semiconductor with an appropriate dopant such as boron and using well known diffusion and drive in steps form diffusions 6 and 31 simultaneously. Where it is desired to form n type diffusion 8 simultaneously with *p* type diffusions 6 and 31, an n type dopant such as arsenic may be simultaneously coated on the exposed semiconductor and diffused and driven in at the same time as the *p* type dopant. This is possible because of the different diffusion rates of the *p* and *n* type materials which have been selected based on this capability to achieve the desired result. Alternatively, *n* type region 8 may be implanted using suitable ion implantation techniques which are well known to those in the ion implantation and semiconductor arts. After the diffusions are formed, a thick oxide layer is regrown over the apertures and utilizing well known photolithographic masking and etching techniques, openings are formed in the oxide over channel regions 32 and 33 preparatory to growing a thin oxide. After a thin oxide is thermally grown over channel regions 32 and 33, a layer of aluminum or other suitable conductive material is deposited on the thick and thin oxide regions. The desired metallization in the form of word lines 2 and read bit line interconnections which interconnect diffusions 8 are formed by well known photolithographic masking and etching techniques.

From the foregoing, it should be clear that the arrangement shown in FIGS. 3 and 4 can be simply fabricated utilizing noncomplementary fabrication techniques while, at the same time, providing a memory cell which consists of a pair of complementary devices with all of the attendant advantages of such a complementary arrangement. A typical memory cell lays out in a relatively small area relative to that required for the single FET-capacitor combination shown in U.S. Pat. No. 3,387,286 to R. Dennard, issued June 4, 1968, and assigned to the same assignee as the present invention. The fact that a d.c. sense current is obtainable from the arrangement of the present application makes such an arrangement particularly attractive because no complex sense amplification circuits are required in addition to the basic array. This, of course, makes available chip areas which were formerly used for such sense amplifiers.

Representative potentials for writing are 8–10 V on write bit line 5, and 10–12 V on word line 2. For sensing, 3–4 V on word line 2 provides sense current flow at a desired level. These values are, of course, a function of a number of independently variable parameters like oxide thickness and substrate doping levels, etc.

In connection with the above description, device T1 has been identified as a pnp device while device T2 has been identified as an npn device. It should be appreciated that the present teaching is not limited to the arrangements shown and that an npn device may be substituted for the pnp device and vice versa. If this were done, the waveform shown in FIG. 2 would be reversed with positive potentials applied where negative potentials were used and vice versa. Also, the fabrication approach would be changed to the extent that the n type diffusant would be the faster diffusing dopant.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A semiconductor memory cell comprising:

a first substrate of a first field effect transistor of one semiconductor conductivity type, a second substrate of a second field effect transistor of second semiconductor conductivity type formed in said first substrate, a region of said second conductivity type disposed in said first substrate, a region of said one conductivity type disposed in said second substrate, and means electrically connected to said region of second conductivity type, and said first and second substrates for applying at least first and second potentials to said second substrate to adjust the threshold of said second FET to at least two different values.

2. A semiconductor memory cell according to claim 1 further including:

means electrically connected to said first and second substrates and said region of said one conductivity for controlling the flow of current between said region of said one conductivity type and said first substrate.

3. A semiconductor memory cell according to claim 1 wherein said one and said second semiconductor conductivity types are n and p, respectively.

4. A semiconductor memory cell according to claim 1 wherein said one and said second semiconductor conductivity type are p and n, respectively.

5. A semiconductor memory cell according to claim 1 wherein said means for applying at least first and second potentials to adjust the threshold of said second field effect transistor includes a first pulsed source connected to said region of said second conductivity type, a conductor disposed in insulated spaced relationship with said first and second substrates and said regions having a portion disposed in electric field coupled relationship with said second substrate and with a portion of said first substrate which is disposed between said second substrate and said region of said second conductivity type and a second pulsed source connected to said conductor, the activation of at least one of said sources being sufficient to apply a potential to said second substrate.

6. A semiconductor cell according to claim 2 wherein said means for controlling the flow of current includes a pulsed source connected to said region of said one conductivity, a conductor disposed in insulated spaced relationship with said first and second substrates and said regions having at least a portion thereof disposed in electric field coupled relationship with said second substrate and a second pulsed source connected to said conductor, the simultaneous activation of said sources controlling the flow of current between said region of said one conductivity type and said first substrate.

7. A semiconductor device according to claim 6 wherein the second pulsed source when activated has an amplitude insufficient to overcome one of said at least two different values of threshold voltage.

* * * * *